US 8,352,838 B2

(12) United States Patent
Komatsu (10) Patent No.: US 8,352,838 B2
(45) Date of Patent: Jan. 8, 2013

(54) CIPHER PROCESSING DEVICE, CIPHER PROCESSING METHOD, AND CIPHER PROCESSING PROGRAM

(75) Inventor: Masahiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 261 days.

(21) Appl. No.: 12/864,568

(22) PCT Filed: Feb. 27, 2009

(86) PCT No.: PCT/JP2009/053657
§ 371 (c)(1),
(2), (4) Date: Jul. 26, 2010

(87) PCT Pub. No.: WO2009/122831
PCT Pub. Date: Oct. 8, 2009

(65) Prior Publication Data
US 2010/0306610 A1    Dec. 2, 2010

(30) Foreign Application Priority Data

Mar. 31, 2008  (JP) .................................. 2008-092864

(51) Int. Cl.
*H03M 13/03* (2006.01)
(52) U.S. Cl. ....................................... 714/776; 714/777
(58) Field of Classification Search .................. 714/776, 714/747
See application file for complete search history.

(56) References Cited

U.S. PATENT DOCUMENTS

2006/0203924 A1* 9/2006 Casaccia et al. .............. 375/260
2008/0219159 A1* 9/2008 Chateau et al. ............... 370/230

FOREIGN PATENT DOCUMENTS

| JP | 2003525556 A | 8/2003 |
| JP | 2006054718 A | 2/2006 |
| JP | 2006087097 A | 3/2006 |
| JP | 2006217100 A | 8/2006 |
| JP | 2006352490 A | 12/2006 |

OTHER PUBLICATIONS

International Search Report for PCT/JP2009/053657 mailed Apr. 21, 2009.
3GPP TS 36.323, Technical Specification Group Radio Access Network; Evolved Universal Terrestrial Radio Access (E-UTRA); Packet Data Convergence Protocol (PDCP) specification (Release 8), V.8.1.0, Mar. 2008; searched on Mar. 24, 2008, Internet <URL: http://www.3gpp.org/ftp/Specs/html-info/36323.htm>.
3GPP TS 35.201, Technical Specification Group Services and System Aspects; 3G Security; Specification of the 3GPP Confidentiality and Integrity Algorithms; Document 1: f8 and f9 specifications (Release 7), V.7.0.0, Jun. 2007, searched on Mar. 24, 2008, Internet <URL: http://www.3gpp.org/ftp/Specs/html-info/35201.htm>.

* cited by examiner

*Primary Examiner* — M. Mujtaba K Chaudry

(57) ABSTRACT

A cipher processing device includes: a MAC loss detecting/estimating section which estimates the radio bearer of the lost protocol data unit and a data amount of the lost protocol data unit out of protocol data units produced by division according to the logical channel information included in a packet combining data unit received by a base station of a mobile communication system; an RLC loss detecting/estimating section which detects occurrence of loss in the protocol data units when the protocol data units are put together into a service data unit, and estimates a lost amount of the protocol data units when the protocol data units are put together into the service data unit according to the estimated data amount; and a correction section which corrects a frame number of the service data unit based on the estimated data amount estimated by the detecting/estimating section.

15 Claims, 7 Drawing Sheets

PDCP PDU 130

HFN 132    PDCP SN 133

| 100 | 00 |
|-----|----|
| 100 | 01 |
| 100 | 10 |
| 100 | 11 |
| 101 | 00 |
| 101 | 01 |
| 101 | 10 |
| 101 | 11 |
| 110 | 00 |
| 110 | 01 |
| 110 | 10 |
| 110 | 11 |

TRANSMISSION SIDE

FIG.4B

PDCP PDU 130

HFN 132    PDCP SN 133

| 100 | 00 |
|-----|----|
| 100 | 01 |
| 100 | 10 |

MISSING OF DATA CORRESPONDING TO SN OF ONE PERIOD OR MORE

MAINTAIN SYNCHRONIZATION

| 110 | 00 |
|-----|----|
| 110 | 01 |
| 110 | 10 |
| 110 | 11 |

RECEPTION SIDE

PDCP PDU

| HFN 402a | SN 402b |
|---|---|
| 100 | 00 |
| 100 | 01 |
| 100 | 10 |
| 100 | 11 |
| 101 | 00 |
| 101 | 01 |
| 101 | 10 |
| 101 | 11 |
| 110 | 00 |
| 110 | 01 |
| 110 | 10 |
| 110 | 11 |

TRANSMISSION SIDE

Prior Art
FIG.7B

PDCP PDU

| HFN 402a | SN 402b |
|---|---|
| 100 | 00 |
| 100 | 01 |
| 100 | 10 |
| 101 | 00 |
| 101 | 01 |
| 101 | 10 |
| 101 | 11 |

MISSING OF DATA CORRESPONDING TO SN OF ONE PERIOD OR MORE

DESYNCHRONIZED

RECEPTION SIDE

CIPHER PROCESSING DEVICE, CIPHER PROCESSING METHOD, AND CIPHER PROCESSING PROGRAM

This Application is the National Phase of PCT/JP2009/053657, filed Feb. 27, 2009, which claims the Priority right based on Japanese Patent Application No. 2008-092864 filed on Mar. 31, 2008, and the disclosure thereof is hereby incorporated by reference in its entirety.

TECHNICAL FIELD

The present invention relates to cipher processing of a mobile communication system and, more specifically, to cipher processing of a case where there is a loss generated in a data unit transmitted in the mobile communication system.

BACKGROUND ART

With a mobile communication system such as LTE (Long Term Evolution), cipher processing is performed on data to be transmitted. Widely-used cipher processing is arranged at PDCP (Packet Data Convergence Protocol) layer as depicted in Chapter 5.3 of Non-Patent Document 1 described later. A PDCP entity corresponds to a single RLC entity or two (one direction×2) RLC entities for each radio bearer according to the characteristics (one direction or two directions) of the radio bearer (referred to as RB hereinafter) and modes (TM (Transparent Mode), UM (Unacknowledged Mode), and AM (Acknowledged Mode)) of RLC (Radio Link Control) on a lower-level layer.

Figure 5:
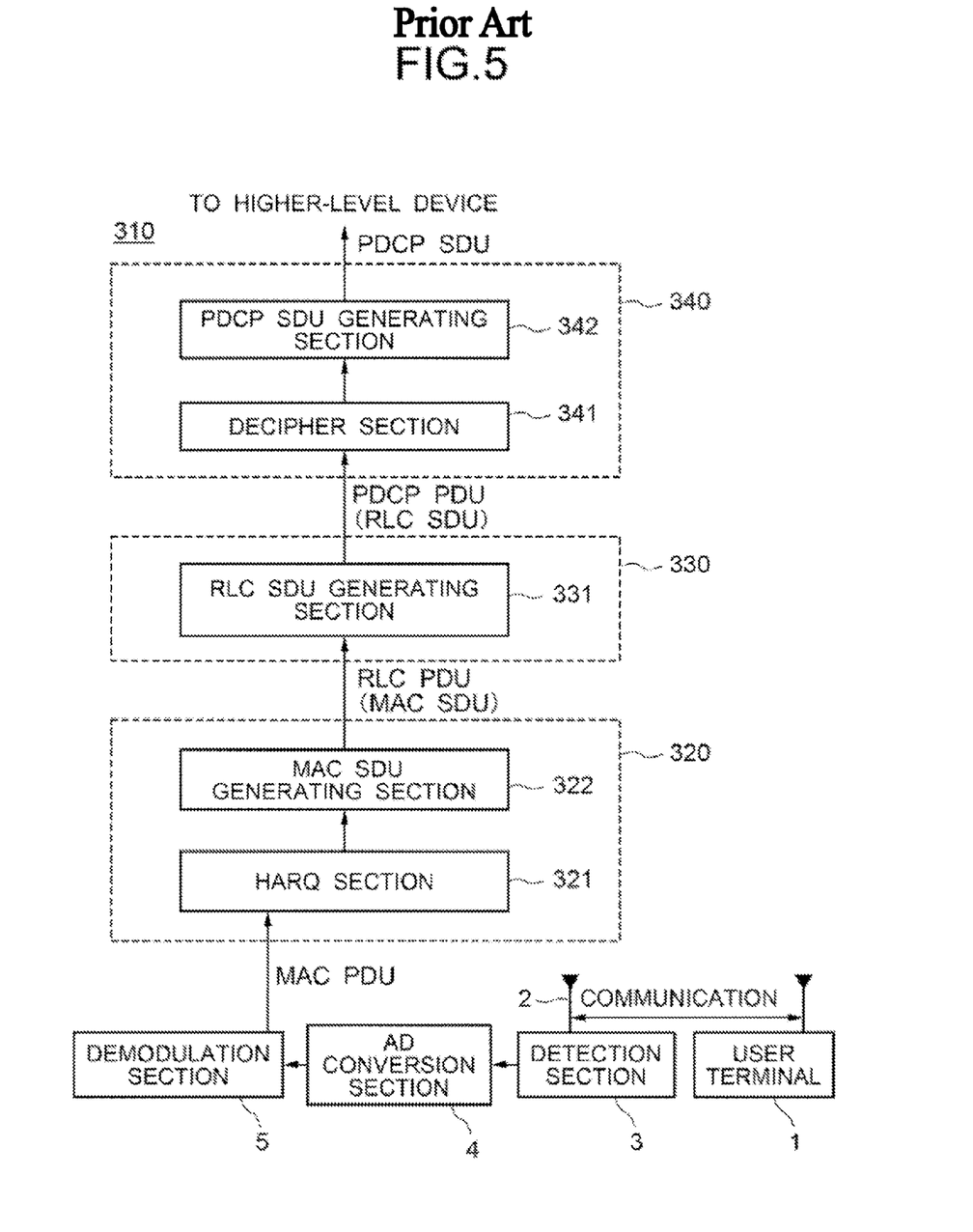
FIG. 5 is a functional block diagram showing the structure of a base station according to widely-used cipher processing.

FIG. 5 is a functional block diagram showing the structure of a base station 310 according to the widely-used cipher processing. The base station 310 sends out a reception signal received via an antenna 2 which receives a radio wave signal from a user terminal 1, a detection section 3, an AD conversion section 4, and a demodulation section 5 as data to a higher-level device (not shown) via a MAC (Media Access Control) layer 320, an RLC layer 330, and a PDCP layer 340 in this order. The MAC layer 320 includes a HARQ (Hybrid Automatic Repeat Request) section 321 and a MAC SDU section 322. The HARQ section 321 resends and synthesizes a reception signal to improve the quality of the reception signal. The MAC SDU generating section 322 generates a MAC SDU (Service Data Unit) from the signal outputted from the HARQ section 321. The RLC layer 330 includes an RLC SDU generating section 331. The RLC SDU generating section 331 generates an RLC SDU from the MAC SDU inputted from the MAC layer 320.

The PDCP layer 340 includes a decipher section 341 and a PDCP SDU generating section 342. The decipher section 341 performs cipher processing (Deciphering) on the PDCP PDU (Protocol Data Unit) from the RLC layer, and performs Integrity Protection, header expansion, and SN elimination thereafter. The PDCP SDU generating section 342 generates a PDCP SDU, and transfers data to the higher-level device (not shown).

Figure 6:
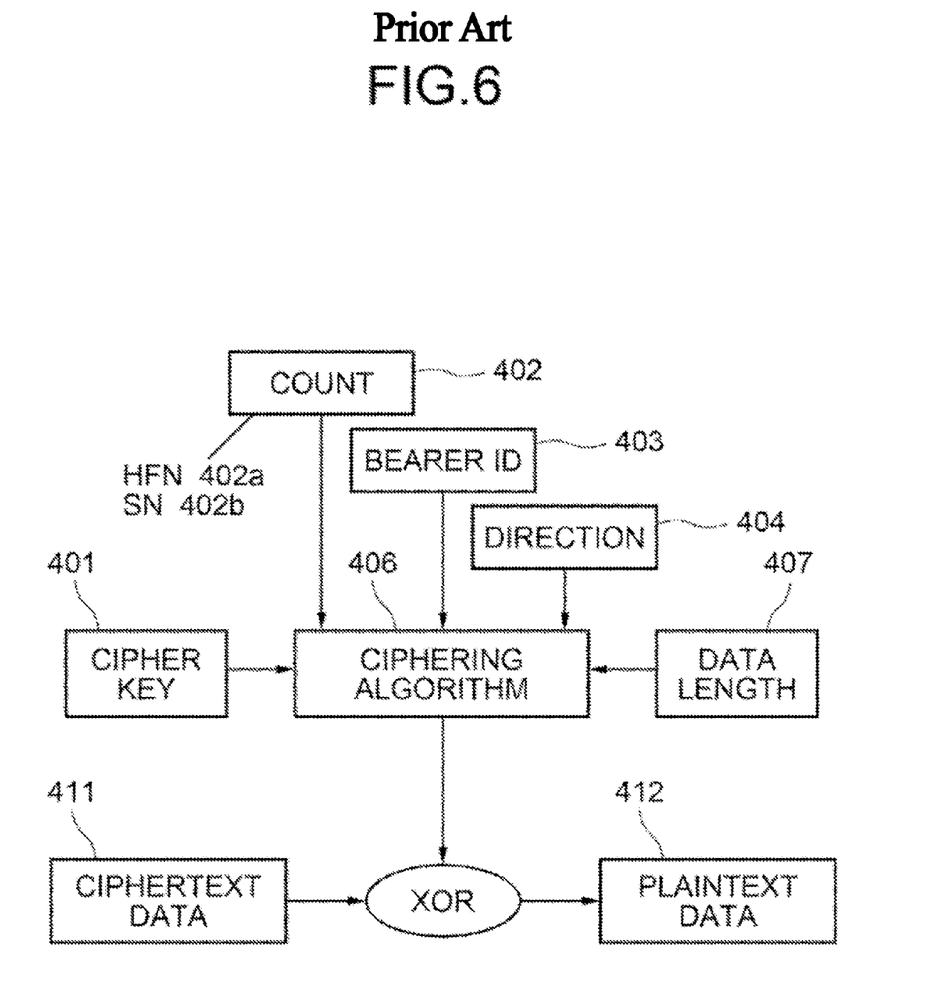
FIG. 6 is a conceptual chart showing the outline of the cipher processing executed by a decipher section shown in FIG. 5.

FIG. 6 is a conceptual chart showing the outline of the cipher processing executed by the decipher section 341 shown in FIG. 5. The cipher processing is performed by a unit of PDCP PDU. A cipher key 401, a count 402 configured with an HEN 402a (Hyper Frame Number) and an SN 402b (Sequence Number), a bearer ID 403 as an ID (Identification) for identifying the bearer, a direction 404 which indicates the communication transmission direction (uplink, downlink), and a data length 407 as parameters of the cipher processing are XOR (Exclusive or)-operated into cipher text data 411 via an algorithm 406 to obtain plaintext data 412 that is being deciphered.

Figure 7A:
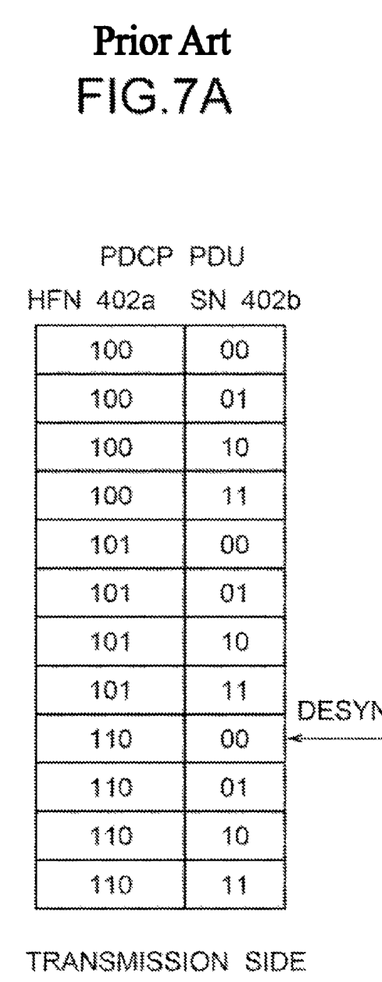
FIG. 7 is a conceptual chart showing the relation between HFN and SN shown in FIG. 6.

FIG. 7 is a conceptual chart showing the relation between the HFN 402a and the SN 402b shown in FIG. 6. As shown in (a) of FIG. 7, in the data on the transmission side, the SN 402b is counted up by each PDCP SDU, and the HFN 402a is counted up every time the SN 402b overflows. For example, there is considered a case where the bit number of the SN 402b is "2". In a case where SN is "0", "1", "2", the SN 402b is incremented by "1" for a next PDCP SDU, and the HFN 402a is unchanged. However, when the SN 402b is "3", the SN 402b for the next PDCP SDU becomes "0", and the HFN 402a is incremented by "1" and that value is employed. FIG. 7 shows a case where the bit number of the SN 402b is "2" and the period is "4".

On the reception side, count-up of the SN 402b is conducted by each PDCP PDU, and the count-up of the HFN is conducted when the SN 402b is smaller than the SN 402b of the previous PDCP PDU. For example, in a case where the period of the SN 402b shown in FIG. 7 is "4", the HFN 402a is incremented by "1" when the SN 402b changes to "0" from "3", and that value is employed.

As techniques related to the cipher processing, there are following documents. Patent Document 1 depicts a technique which detects whether or not cipher release processing is properly done by comparing CRC, and changes HFN when it is improper. Patent Document 2 depicts a technique which detects asynchronization of HFN between a plurality of communication stations, and adjusts HFN when asynchronization is detected.

Patent Document 3 depicts a technique which avoids desynchronization of HFN by utilizing the sequence numbers that are standardized in all modes of RFC. Patent Document 4 depicts a technique which selects and uses the maximum HFN used in a session to initialize a counter parameter. Non-Patent Documents 1 and 2 depict standards regarding cipher processing executed in a mobile communication system such as LTE (Long Term Evolution).

Patent Document 1: Japanese Unexamined Patent Publication 2006-054718
Patent Document 2: Japanese Unexamined Patent Publication 2006-087097
Patent Document 3: Japanese Unexamined Patent Publication 2006-352490
Patent Document 4: Japanese Patent Application Publication 2003-525556
Non-Patent Document 1: 3GPPTS 36.323: "3rd Generation Partnership Project; Technical Specification Group Radio Access Network; Evolved Universal Terrestrial Radio Access (E-UTRA); PacketData Convergence Protocol (PDCP) specification", (searched on Mar. 24, 2008), Internet <URL: http://www.3gpp.org/ftp/Specs/html-info/36323.htm>
Non-Patent Document 2: 3GPP TS 35.201: "3rd Generation Partnership Project; Technical Specification Group Services and System Aspects; Specification of the 3GPP confidentiality and integrity algorithms; Document 1:f3 and f9 specifications", (searched on Mar. 24, 2008), Internet <URL: http://www.3gpp.org/ftp/Specs/html-info/35201.htm>

SUMMARY OF THE INVENTION

Problems to be Solved by the Invention

In the cipher processing described above, it is necessary for the HFN 402a and the SN 402b to be synchronized on the transmission side and the reception side. The HFN 402a is synchronized at the time setting RB. However, thereafter, the SN 402b is incremented every time the PDCP PDU is received, and the HFN 402a is only incremented successively in accordance therewith.

Figure 7B:
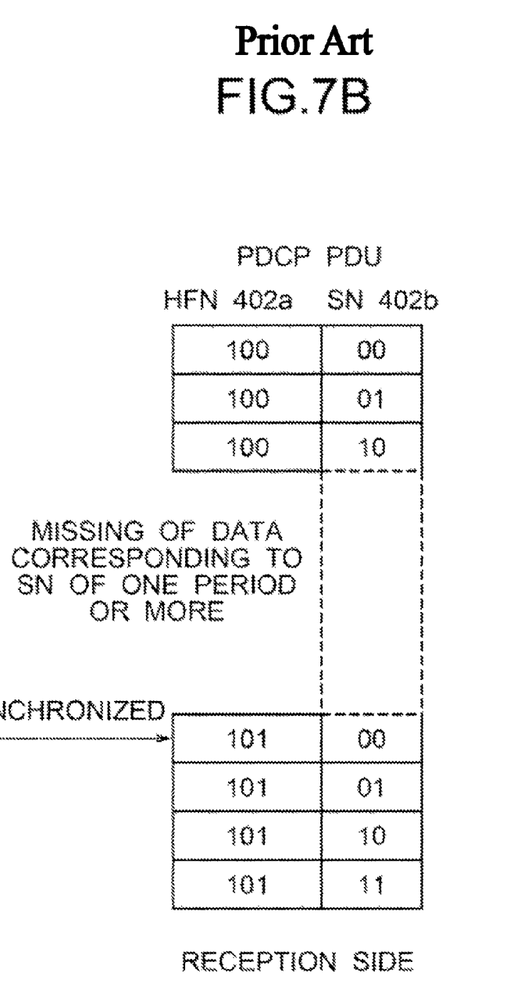

Therefore, in a case where the PDCP PDU of one period or more of the SN 402b becomes lost continuously on the data of the reception side shown in (b) of FIG. 7, the transmission side and the reception side cannot be synchronized. When the period of the SN 402b is "4" as shown in FIG. 7, the HFN 402a on the transmission side is counted up. However, when five PDCP PDUs of one period or more of the SN 402b become lost on the reception side, one count-up of the HFN 402a on the reception side is missed. Thus, the HFN 402 is desynchronized. This issue also occurs even when the bit number of SN is other than "2". The techniques of Patent Document 1-4 can correct HFN in a case of desynchronization. However, there is no depiction regarding correction of SN in those documents.

An object of the present invention is to provide a cipher processing device, a cipher processing method, and a cipher processing program, which can precisely synchronize HFN and SN on the transmission side and the reception side, even when PDCP PDUs of one period or more become lost continuously.

Means for Solving the Problems

In order to achieve the foregoing object, the cipher processing device according to the present invention is a cipher processing device which performs cipher processing on a packet combining data unit that is transmitted from a mobile station of a mobile communication system and received at a base station, and the cipher processing device includes: a MAC (Media Access Control) loss detecting/estimating section which detects occurrence of loss in the protocol data units divided by each logic channel based on information of the logic channels which specify radio bearers contained in the data unit, and estimates the radio bearer of the lost protocol data unit and a data amount of the lost protocol data unit; an RLC (Radio Link Control) loss detecting/estimating section which detects occurrence of loss in the protocol data units when putting together the divided protocol data units into a service data unit for a higher-level device, and estimates a lost amount of the protocol data units when making the service data unit based on the data amount estimated by the MAC loss detecting/estimating section; and a correction section which corrects a frame number of the service data unit based on the estimated data amount from the RLC loss detecting/estimating section.

While the present invention has been described by referring to a case where the present invention is built as a cipher processing device, the present invention is not limited only to such case. The present invention may also be built as a method or a program as software. When the preset invention is built as a method, the cipher processing method according to the present invention is a cipher processing method which performs cipher processing on a packet combining data unit that is transmitted from a mobile station of a mobile communication system and received at a base station, and the cipher processing method includes: dividing the packet combining data unit into a plurality of protocol data units by each logic channel based on information of the logic channels which specify radio bearers contained in the data unit; detecting occurrence of loss in the protocol data units divided by each of the logic channels, and estimating the radio bearer of the lost protocol data unit and a data amount of the lost protocol data unit; putting together the divided protocol data units into a service data unit for a higher-level device; detecting occurrence of loss in the protocol data units when making the service data unit, and estimating a lost amount of the protocol data units when making the service data unit based on the estimated data amount; and correcting a frame number of the service data unit based on the data amount that is estimated when making the service data unit.

When the present invention is built as a program, the cipher processing program according to the present invention is a cipher processing program which controls cipher processing executed on a packet combining data unit that is transmitted from a mobile station of a mobile communication system and received at a base station, and the cipher processing program causes a computer to execute: a function that divides the packet combining data unit into a plurality of protocol data units by each logic channel based on information of the logic channels which specify radio bearers contained in the data unit; a function that detects occurrence of loss in the protocol data units divided by each of the logic channels, and estimates the radio bearer of the lost protocol data unit and a data amount of the lost protocol data unit; a function that puts together the divided protocol data units into a service data unit for a higher-level device; a function that detects occurrence of loss in the protocol data units when making the service data unit, and estimates a lost amount of the protocol data units when making the service data unit based on the estimated data amount; and a function that corrects a frame number of the service data unit based on the data amount that is estimated when making the service data unit.

Effect of the Invention

The present invention is structured to estimate the radio bearer and data amount as described above, and to correct HFN and SN based thereupon. Therefore, it is possible to know the lost HFN and SN precisely for the loss of the PDCP PDUs of one period or more. This makes it possible to synthesize HFN and SN on the transmission side and the reception side precisely, even when the PDCP PDUs of one period or more become lost continuously.

BEST MODES FOR CARRYING OUT THE INVENTION

Figure 1:
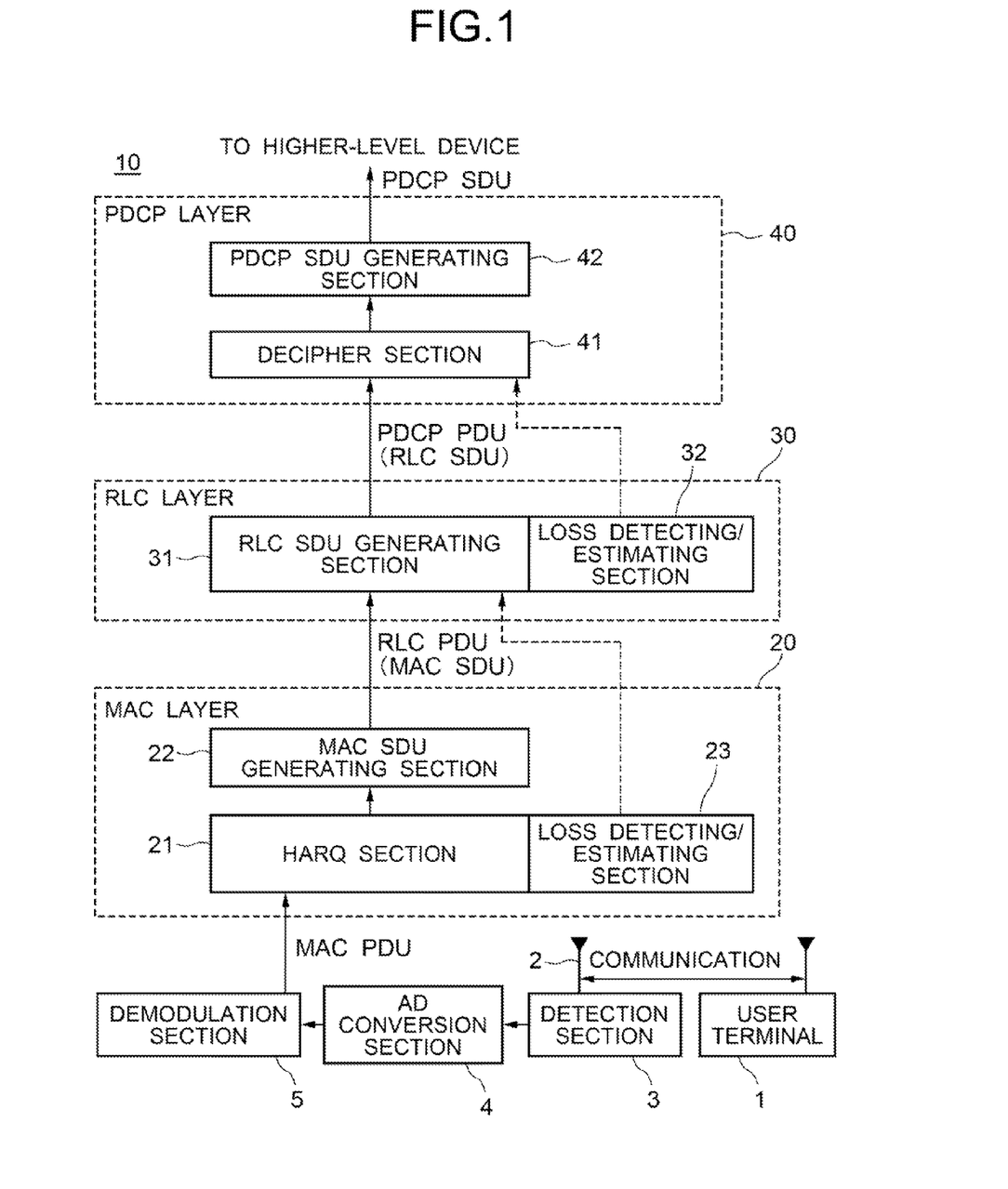
FIG. 1 is a functional block diagram showing the structure of a base station according to an exemplary embodiment of the invention.

FIG. 1 is a functional block diagram showing a cipher processing device 10 that is mounted into a base station according to an exemplary embodiment of the invention. The cipher processing device 10 shown in FIG. 1 performs cipher processing on a received packet combining data unit that is transmitted from a mobile station of a mobile communication system and received at the base station, and executes functions of a physical layer including an antenna 2, a detection section 3, an AD conversion section 4, and a demodulation section 5 as well as a standardized MAC (Media Access Control) layer 20 as the logical layer for signal processing the signal received by the physical layer, an RLC (Radio Access Control) layer 30, and a PDCP (Packet Data Convergence Protocol) layer 40. The physical layer has a function which physically performs communications between the base station and the mobile station. The MAC layer has a function which performs a control for effectively using the resources of the radio link. The RLC layer has a function which performs a communication control for reducing packet transmission errors of the packet combining data unit.

The cipher processing device 10 sends out a reception signal acquired via the antenna 2, the detection section 3, the AD conversion section 4, and the demodulation section 5 as data to a higher-level device (not shown) via the MAC layer 20, the RLC layer 30, and the PDCP layer 40 in this order. The antenna 2 receives a radio wave signal from a user terminal (mobile station) 1 as an UE (User Equipment), the detection section 3 detects an output signal from the antenna 2 and extracts an analog signal, and the AD conversion section 4 converts the analog signal outputted from the detection section 3 into a digital signal. The demodulation section 5 demodulates the digital signal outputted from the AD conversion section 4, and outputs it to the MAC layer 20.

As shown in FIG. 1, as the basic structures, the cipher processing device according to the exemplary embodiment of the invention is characterized to include: a MAC loss detecting/estimating section 23 which detects occurrence of loss in the protocol data unit 120 that is divided by each logic channel based on information of logic channels which specify the radio bearers contained in the packet combining data unit 110 that is transmitted from the mobile station of the mobile communication system and received at the base station, and estimates the radio bearer of the lost protocol data unit 120 and the data amount of the lost protocol data unit; an RLC loss detecting/estimating section 32 which detects occurrence of loss of the protocol data unit at the time of putting together the divided protocol data units 120 into a service data unit 130 for the higher-level device, and estimates the loss amount of the protocol data units at the time of making the service data unit based on the data amount estimated by the MAC loss detecting/estimating section 23; a correction section 41 which corrects a frame number of the service data unit based on the estimated data amount from the RLC loss detecting/estimating section 32.

With the exemplary embodiment of the invention, the MAC SDU generating section 22 is used to divide the packet combining data unit into a plurality of protocol data units 120 by each logic channel based on the information of the logic channels which specify the radio bearers contained in the packet combining data unit 110 that is transmitted from the radio station of the radio communication system and received at the base station. Then, the MAC loss detecting/estimating section 32 is used to detect occurrence of the loss of the protocol data units divided by each of the logic channels, and estimate the radio bearer of the lost protocol data units and the data amount of the lost protocol data units. Thereafter, the RLC SDU generating section 31 is used to put together the divided protocol data units into the service data unit 130 for the higher-level device, detect occurrence of the loss of the protocol data units at the time of making the service data unit 130, and estimate the loss amount of the protocol data units at the time of making the service data unit based on the estimated data amount. Then, the correction section 41 is used to correct the frame number of the service data unit 130 based on the data amount estimated at the time of making the service data unit.

Next, the exemplary embodiment of the invention will be described in more details by referring to a specific example. In the case shown in FIG. 1, a low detecting/estimating section 23 of the MAC layer 20 is used as the MAC detecting/estimating section 23 and a low detecting/estimating section 31 of the RLC layer 31 is used as the RLC detecting/estimating section 32 to have a decipher section 41 of the PDCP layer 10 execute the function of the correction section 41.

The MAC layer 20 includes the HARQ (Hybrid Automatic Repeat Request) section 21, the MAC SDU generating section 22, and the loss detecting/estimating section 23. The HARQ section 21 improves the quality of the reception signals by retransmitting and synthesizing the reception signals. The MAC SDU generating section 22 generates MAC SDU from the signals outputted from the HARQ section 21. The loss detecting/estimating section 23 makes a judgment on the signal with a loss generated in the HARQ section 21 by each user terminal 1, and notifies it to the RLC layer 30.

The RLC layer 30 includes an RLC SDU generating section 31 and a loss detecting/estimating section 32. The RLC SDU generating section 31 generates an RLC SDU from a MAC SDU inputted from the MAC layer 20. The loss detecting/estimating section 32 makes a judgment on the data where a loss is generated by each RB based on the loss information from the MAC layer 20 and the checked result of the continuity of SN in an RLC header 121 (described later), and informs it to the PDCP layer 40.

The PDCP layer 40 includes the decipher section 41 and a PDCP SDU generating section 42. The decipher section 41 corrects HFN by using the RLC SDU inputted from the RLC layer 30 and the loss information, and releases the cipher by using the parameter such as the count and the like configured with HFN and SN. The PDCP SDU generating section 42 generates PDCP SDU, and sends it out to the higher-level device.

Figure 2:
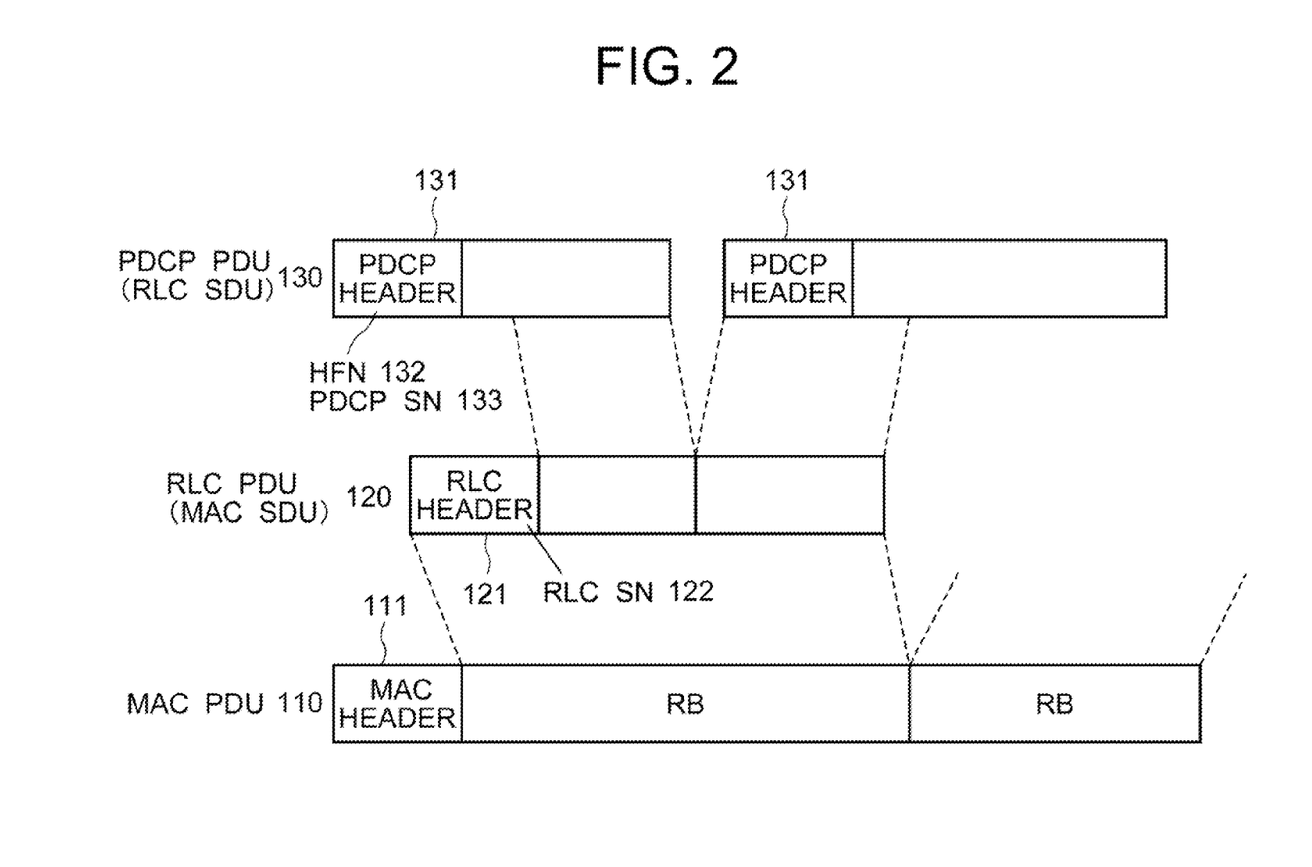
FIG. 2 is a conceptual chart showing the structure of each data processed in the base station shown in FIG. 1.

FIG. 2 is a conceptual chart showing the structure of each data processed in the base station 10 shown in FIG. 1. The MAC PDU 110 sent out from the MAC layer 20 is configured with a MAC header 111 located at the front and a plurality of RLC PDUs 120 (=MAC SDUs) following thereafter. The MAC PDU 110 includes a plurality of RBs. However, the processing of the RLC PDUs 120 is executed by each RB. The RLC PDU 120 sent out from the RLC layer 30 is configured with an RLC header 121 located at the front, and a plurality of PDCP PDUs 130 (=RLC SDUs) following thereafter. Each of the PDCP PDUs 130 includes a PDCP header 131.

The MAC layer 20 of the base station 10 gives a signal for permitting upstream transmission to the opposing user terminal 1 in a downlink by scheduling. Upon receiving the upstream transmission permission, the user terminal 1 transmits an upstream signal as the MAC PDU 110. For the reception signal inputted from the antenna 2, the detection section 3, and the AD conversion section 4, the HARQ section 21 has the user terminal 1 retransmit a part of the upstream reception signal, which has not been received correctly, and synthesizes the retransmitted part with the correctly received part (this is called retransmitting and synthesizing). Thereby, the quality of the reception signal sent out to the MAC SDU generating section 22 is improved.

Figure 3:
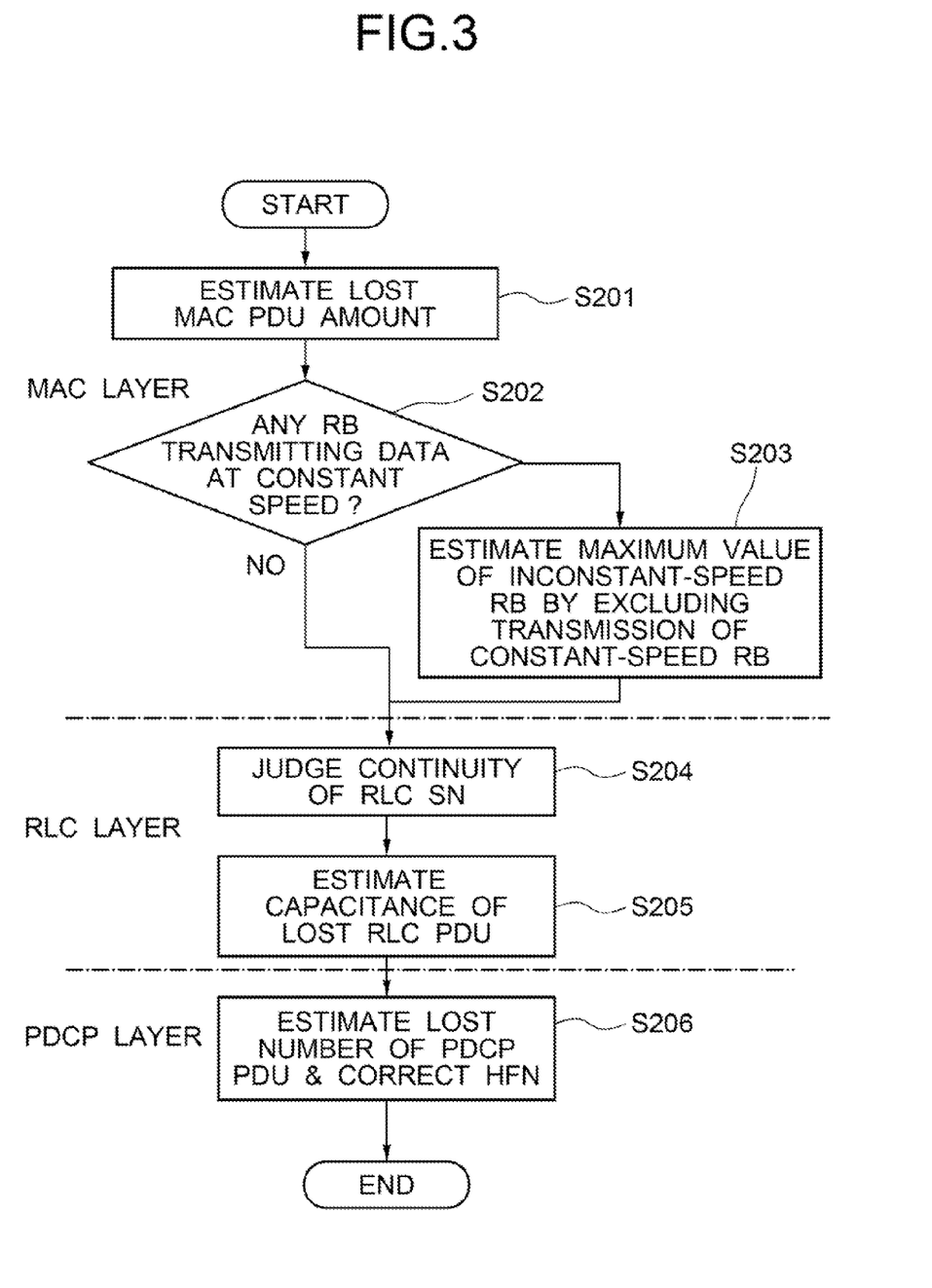
FIG. 3 is a flowchart showing processing of loss estimation and correction of HFN executed by the base station shown in FIG. 1.

FIG. 3 is a flowchart showing processing of loss estimation and HFN correction performed by the base station 10 shown in FIG. 1. The HARQ section 21 advances to the processing of the MAC SDU generating section 22, when the check result of the properness of the data such as CRC embedded to each of the MAC PDUs 110 indicates being proper. When the check result of the data properness does not turn out as proper even when it reaches the maximum retransmission time of HARQ, the data is judged as a loss. The size of the MAC PDU 110 showing the data amount contained therein can be known from demodulation information contained in the MAC header 111.

The MAC PDU 110 is configured with a plurality of RLC PDUs 120. The information of the logic channel for specifying the RB is contained in the MAC header 111, so that the MAC SDU generating section 22 divides the MAC PDU 110 into the RLC PDUs 120 by each RB based thereupon. The number of RBs is already known, since the information is exchanged on the RRC (Radio Resource Control, not shown) layer of the higher level before starting transmission and reception of the data, and it is informed to each of the layers (the PDCP layer 40, the RLC layer 30, and the MAC layer 20).

The loss detecting/estimating section 23 estimates the logic channel having a loss generated in the MAC PDU 110 and the amount thereof (FIG. 3: step S201). As described above, the transmission permission signal is given to the user terminal 1 in advance, so that which of the user terminals 1 the signal is transmitted from is evident. However, when the number of RBs received from the user terminal 1 is "2" or more, it is necessary to first specify the RB corresponding to the lost signal.

Thus, the loss detecting/estimating section 23 estimates that the radio bearer is lost when the radio bearers that are to be transmitted and received periodically are unreceived after a prescribed interval has passed. Alternatively, the loss detecting/estimating section 23 estimates the lost radio bearer and the data amount based on the proportion of the radio bearer included in the radio bearers therebefore and thereafter which are received properly. Alternatively, in a case where a radio bearer conducting constant-speed communication is included in the lost radio bearers, the loss detecting/estimating section 23 estimates the capacitance that is obtained by excluding the capacitance of the radio bearer conducting the constant-speed communication from the lost radio bearer and the data amount as the maximum value of the data amount lost in the radio bearer conducting inconstant-speed communication. These will be described in a specific manner.

First, described is the case where the loss detecting/estimating section 23 estimates that the radio bearer is lost when the radio bearers to be transmitted and received are unreceived after a prescribed interval has passed. The loss detecting/estimating section 23 judges whether or not there exists RB that conducts constant-speed communication which transmits and receives data of a specific amount a periodically such as VoIP (Voice over Internet Protocol) (FIG. 3: step S202). When there is such RB, the loss detecting/estimating section 23 estimates the amount, which is obtained by excluding the data amount corresponding to the RB that conducts the constant-speed communication from the data amount of the lost MAC PDU 110, as the maximum value of the loss in the inconstant-speed communication (communication that is not constant-speed communication) (FIG. 3: step S203).

When the RB is conducting the constant-speed communication, it is expected to transmit data of the specific amount a by every specific time T. Thus, when a signal of the RB is not received even after the prescribed time T has passed from the point at which the previous signal is received, the loss detecting/estimating section 23 estimates that the signal of the specific amount $\alpha$ is lost in that RB. Note that "at the point where the previous signal is received and the signal of RB is not received" refers to reception of the first transmission of the HARQ, and it is not an output of the HARQ section 21. Further, the specific time T is not limited to be a specific time interval, so that the loss detecting/estimating section 23 judges whether or not a signal is received within a time with a certain margin after the prescribed time T.

Next, described is the case where the loss detecting/estimating section 23 estimates the lost radio bearer and the data amount from the proportion of the radio bearer contained in the radio bearers received therebefore and thereafter. When the RB is conducting the inconstant-speed communication, it is difficult to specify the RB that corresponds to the lost signal. However, it is expected that the loss of a specific RB continues within a narrow time range. Thus, from the signals before and after the corresponding signal on the time axis, the loss detecting/estimating section 23 estimates that the RBs same as those signals are lost. The MAC PDU 110 may sometimes contain padding and control data, so that the lost data amount cannot be calculated accurately. However, it is evident that the data amount the RB has lost is equal to or less than the amount of data that is lost from the size of the MAC PDU 110. Therefore, the loss detecting/estimating section 23 can take the size of the MAC PDU 110 as the maximum value of the amount of the data the RB has lost.

Further, "signals therebefore and thereafter" may be both or one of the signals one before and one after which are received properly. Alternatively, information of two or more signals therebefore and two or more signals thereafter may be leveled and used.

Next, described is the case where the loss detecting/estimating section 23 estimates the capacitance that is obtained by excluding the capacitance of the radio bearer conducting the constant-speed communication from the lost radio bearer and the data amount as the maximum value of the data amount lost in the radio bearer conducting an inconstant-speed communication, when the radio bearer conducting the constant-speed communication is included in the lost radio bearers.

For example, there is considered a case where the MAC PDU 110 lost when the HARQ reaches the maximum retransmission times is identified as of 4000 bytes in a radio communication using MAC PDUs 110 each having RB1 which transmits and receives data of 100 bytes every 20 msec (milliseconds) as well as RB2 and RB3 other than that. In this case, "$\alpha$=100 bytes/20 msec.

In a case where the time from the point at which the first HARQ transmission of the RB1 is received in the previous time to the point at which the first transmission of the HARQ of the MAC PDU 110 lost this time is received exceeds "20 msec $\beta$", the loss detecting/estimating section 23 estimates that the RB1 is included in the lost MAC PDU and the data amount thereof is 100 bytes. Note here that "$\beta$" is a coefficient for giving a margin of time, and it is 10 msec., for example.

The loss detecting/estimating section 23 can estimate that the RB2 and RB3 are included in remaining 3900 bytes. However, when the RB2 is contained in the data of the MAC PDU received successfully just before but the RB3 is not contained therein, the loss detecting/estimating section 23 estimates that the RB2 is of 3900 bytes at the maximum. In the actual calculation, the loss detecting/estimating section 23 performs calculation by considering the header length. The loss detecting/estimating section 23 performs estimation of the RB of the lost signal and estimation of the lost data amount in this manner, and informs those to the RLC layer 30.

Then, the RLC layer 30 of the base station generates the RLC SDU 130 from the MAC SDU 120 by using the RLC SDU generating section 31. The RLC PDU 120 is configured with a plurality of PDCP PDUs 130. However, the RLC PDU 120 is generated by connecting and dividing the plurality of PDCP PDUs 130, so that dividing sections of the PDUs do not coincide with each other. The RLC header 121 includes information showing the dividing sections for generating the PDCP PDUs 130 and an RLC SN 122 showing the number of the RLC PDU 120. The RLC SDU generating section 31 generates the RLC SDU 130 based on the information of the RLC header 121.

The loss detecting/estimating section 32 of the RLC layer 30 detects and estimates the loss of the RLC SDU 130. Specifically, the loss detecting/estimating section 32 estimates the lost data amount based on the continuity of the serial numbers contained in the data units. Consecutive numbers are given and transmitted in advance to the RLC headers 121 by the user terminal 1. The consecutive numbers are called the RLC SN 122 herein. The loss detecting/estimating section 32 detects the loss of the RLC PDU 120 based on the continuity in the numbers of the RLC SNs 122.

The loss detecting/estimating section 32 judges the continuity of the RLC SN 122s (FIG. 3: step S204), and estimates the loss amount of the RLC PDU 120 from the continuity and the estimated loss data amount that is estimated by the loss detecting/estimating section 23 of the MAC layer 20 (FIG. 3: step S205). When the RLC SNs are isolated by "3" or more, it means that two or more consecutive RLC PDUs 120 are lost. The estimated data amount of the lost data in the nonconsecutive part is the total estimated data amount lost in each of the RLC PDUs 120.

When the RB2 is lost in the above-described case, the loss detecting/estimating section 32 estimates that the lost data amount is 3900 bytes at the maximum if the lost RLC PDU 120 is nonconsecutive. In the actual calculation, the loss detecting/estimating section 32 performs calculation by considering the header length. The loss detecting/estimating section 32 performs estimation of the lost data amount in this manner, and informs it to the PDCP layer 40.

Then, the PDCP layer 40 of the base station uses the decipher section 41 to obtain the count from the PDCP SN 133 contained in the PDCP header 131 and the HFN 132 held independently, and releases the cipher by using the parameter such as the count.

Note here that the HFN 132 may not be synchronized in a case where the loss is generated continuously. Thus, it is necessary to correct the HFN 132. Therefore, the decipher section 41 detects the loss of the PDCP PDU 130 from the continuity of the PDCP SNs 133 within the PDCP headers 131. Further, the decipher section 41 estimates the loss amount of the PDCP PDU 130 from the estimated lost data amount from the RLC layer.

The decipher section 41 estimates the number of the lost PDCP PDUs 130 from the size of the average PDCP PDUs 130 before and after, and decides the lost number of the PDCP PDUs 130 closest to the actual PDCP SN 133 of the PDCP PDUs 130 that are received properly (FIG. 3: step S206). In this case, the decipher section 41 can decide the closest value that does not exceed the estimated lost amount of the PDCP PDUs 130 as the lost number of the PDCP PDUs 130, considering that the lost estimated data amount is the maximum value. When the lost number of the PDCP PDUs 130 is determined, the HFN 132 can be corrected based thereupon.

Figure 4A:
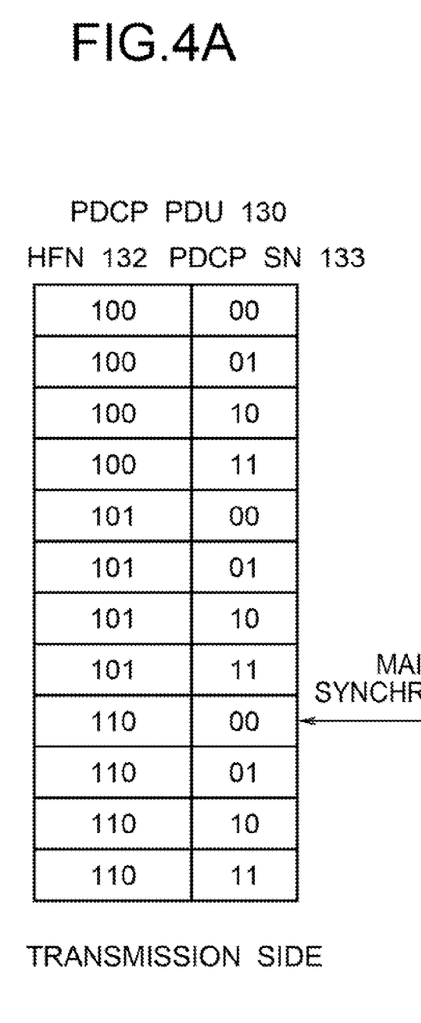
FIG. 4 is a conceptual chart showing the state of maintaining synchronization in a case where there is missing of data generated in one period or more in a PDCP layer shown in FIG. 1.
Figure 4B:
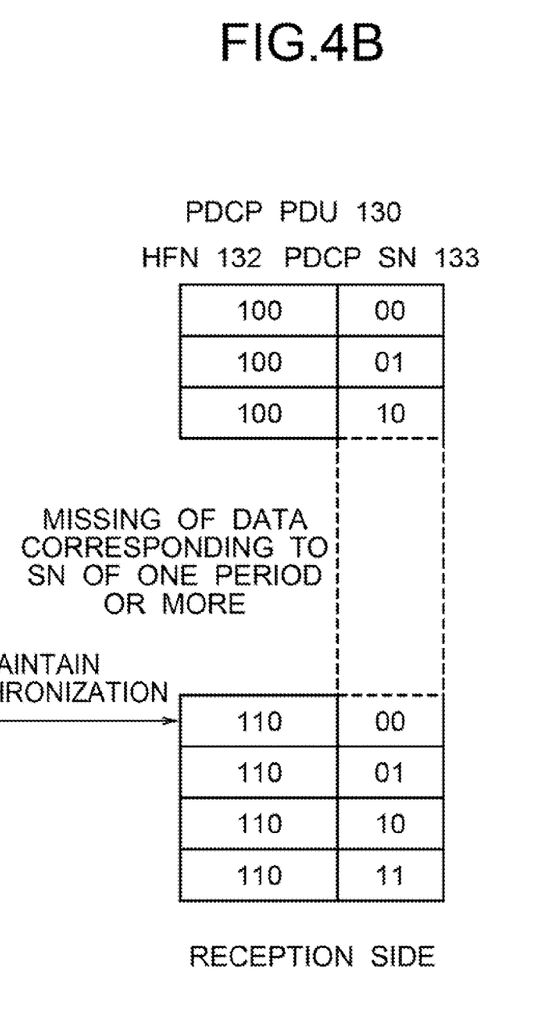

FIG. 4 is a conceptual chart showing the state of maintaining the synchronization when there is missing of data continued for one period or more in the PDCP layer 40 shown in FIG. 1. In FIG. 4, both the PDCP SN 133 and the HFN 132 are expressed in the binary system. The value of the HFN 132 changes from "100" to "110" in the RB2 of the transmission signal from the transmission side (the user terminal 1), and two bits of the value of the PDCP SN 133 in the values of each of the HFNs 132 circulates from "00" to "11".

Note here that there is a loss of the data amount of 3900 bytes as described above generated in the received RB2 in the PDCP layer 40 on the reception side. At this time, when the size the average PDCP PDU 130 is 675 bytes, the decipher section 41 estimates that about six PDCP PDUs 130 are lost from the loss of the data amount of 3900 bytes.

In FIG. 4, when the PDCP SN 133 of the PDCP PDU 130 received properly in the previous time is "2" ("10" in the binary number), the HFN is "4" ("100" in the binary number), and the PDCP SN 133 of the PDCP PDU 130 received properly this time is "0" ("00" in the binary number), the number of missed PDCP PDUs 130 can be considered to be "1", "5", "9", etc. As described above, the estimated value of the number of the lost PDCP PDUs 130 is "6" and the closest value to that is "5", so that the decipher section 41 decides that the number of actually lost PDCP PDUs 130 is "5". At this time, the decipher section 41 corrects the HFN to "6" ("110" in the binary number). In the actual calculation, the decipher section 41 performs calculation by considering the header length.

Note that the decipher section 41 can also make estimation from the maximum value, the minimum value, the order, the distribution, and the like, other than using the average value as the size of the PDCP PDU 130. When the PDCP PDUs 130 of 1200 bytes and 150 bytes are alternately continued, for example, the decipher section 41 can estimate that 3900 bytes can be broken down to 1200 bytes, 150 bytes, 1200 bytes, 150 bytes, and 1200 bytes. Thereafter, the PDCP SDU generating section 42 generates the PDCP SDU based on the information from the decipher section 41, and sends out the data to the higher-level device (not shown).

In the case mentioned above, the MAC layer 20 estimates the lost RB data and the data amount thereof, the RLC layer 30 estimates the amount of data lost in the entire inconstant-speed communication, and the decipher section 41 of the PDCP layer 40 estimates the number of the lost PDCP PDUs, and corrects the HFN. Further, in addition, the decipher section 41 can correct the lost RB and the data amount from the actually settled loss information.

For example, in the above-described case, the loss detecting/estimating section 23 of the MAC layer 20 estimates the loss amount of the RB1 as 100 bytes, and estimates the loss of the RB2 as 3900 bytes at the maximum when there is a loss of 3900 bytes at the maximum as the total of the RB2 and RB3, and the RB2 is contained in the data of the MAC PDU 110 that is received successfully just before but the RB3 is not contained therein.

However, when the continuity of the PDCP SNs is maintained and no loss is recognized in the PDCP layer 40 of the RB1, the loss detecting/estimating section 23 of the MAC layer 20 judges that there is a problem in the estimation of the MAC layer. Thus, the loss detecting/estimating section 23 may re-estimate the loss as being 4000 bytes at the maximum as the total of the RB2 and the RB3.

Further, in a case where the continuity of the PDCP SNs 133 is not maintained in the PDCP layer 40 of the RB2 but the estimated loss amount is too large, e.g., in a case where the lost number of the PDCP PDU 130 can be only considered as "1", the maximum size of the PDCP PDU 130 is estimated as being 1500 bytes. In that case, the decipher section 41 of the PDCP layer 40 judges that there is a problem in the estimation of the MAC layer 20, and may re-estimate that a loss is generated also in the RB3 and the maximum value of the loss is 2500 bytes.

While the present invention has been described by referring to the specific embodiments shown in the drawings, the present invention is not limited only to those embodiments shown in the drawings. It is to be understood that any known structures can be employed as long as the effects of the present invention can be achieved therewith.

INDUSTRIAL APPLICABILITY

The present invention can be applied to cipher processing of a mobile communication system.

REFERENCE NUMERALS

1 User terminal (mobile station)
2 Antenna
3 Detection section
4 AD conversion section
5 Demodulation section
10 Cipher processing device
20 MAC layer
21 HARQ section
22 MAC SDU generating section
23 Loss detecting/estimating section
30 RLC layer
31 RLC SDU generating section
32 Loss detecting/estimating section
40 PDCP layer
41 Decipher section (correction section)
42 PDCP SDU generating section
110 MAC PDU
111 MAC header
120 RLC PDU
121 RLC header
122 RLC SN
130 PDCP PDU
131 PDCP header
132 HFN
133 PDCP SN

The invention claimed is:

1. A cipher processing device which performs cipher processing on a packet combining data unit that is transmitted from a mobile station of a mobile communication system and received at a base station, the cipher processing device comprising:
a MAC (Media Access Control) loss detecting/estimating section which detects occurrence of loss in protocol data units created by dividing the packet combining data unit for each logic channel by a MAC SDU (service data unit) generating section included in advance based on information of the logic channels which specify radio bearers contained in the packet combining data unit, and estimates the radio bearer of a lost protocol data unit and a data amount of the lost protocol data unit;
an RLC (Radio Link Control) loss detecting/estimating section which detects occurrence of loss in the protocol data units when putting together the divided protocol data units into a service data unit for a higher-level device, and estimates a lost amount of the protocol data units when making the service data unit based on the data amount estimated by the MAC loss detecting/estimating section; and
a correction section which corrects a frame number of the service data unit based on the estimated data amount from the RLC loss detecting/estimating section.

2. The cipher processing device as claimed in claim 1, wherein
when the radio bearer to be transmitted and received periodically is unreceived after a prescribed time interval has passed, the MAC loss detecting/estimating section estimates that the radio bearer is lost.

3. The cipher processing device as claimed in claim 1, wherein
the MAC loss detecting/estimating section estimates the lost radio bearer and the data amount from a proportion of the radio bearer included in the radio bearers of therebefore and thereafter which are received properly.

4. The cipher processing device as claimed in claim 1, wherein
when a radio bearer conducting constant-speed communication is included in the lost radio bearers, the MAC loss detecting/estimating section estimates a capacitance that is obtained by excluding a capacitance of the radio bearer conducting the constant-speed communication from the lost radio bearers and the data amount as a maximum value of the data amount lost in the radio bearer that is conducting inconstant-speed communication.

5. The cipher processing device as claimed in claim 1, wherein
the RLC loss detecting/estimating section estimates the lost data amount based on continuity of serial numbers contained in the protocol data units.

6. A cipher processing method which performs cipher processing on a packet combining data unit that is transmitted from a mobile station of a mobile communication system and received at a base station, the cipher processing method comprising:
dividing the packet combining data unit into a plurality of protocol data units by each logic channel based on information of the logic channels which specify radio bearers contained in the packet combining data unit;
detecting occurrence of loss in the protocol data units created by dividing the packet combining data unit for each of the logic channels by a MAC SDU (service data unit) generating section included in advance, and estimating the radio bearer of the lost protocol data unit and a data amount of the lost protocol data unit;
putting together the divided protocol data units into a service data unit for a higher-level device;
detecting occurrence of loss in the protocol data units when making the service data unit, and estimating a lost amount of the protocol data units when making the service data unit based on the estimated data amount; and
correcting a frame number of the service data unit based on the data amount that is estimated when making the service data unit.

7. The cipher processing method as claimed in claim 6, comprising:
estimating that the radio bearer is lost when the radio bearer to be transmitted and received periodically is unreceived after a prescribed time interval has passed.

8. The cipher processing method as claimed in claim 6, comprising:
estimating the lost radio bearer and the data amount from a proportion of the radio bearer included in the radio bearers of therebefore and thereafter which are received properly.

9. The cipher processing method as claimed in claim 6, comprising:

when a radio bearer conducting constant-speed communication is included in the lost radio bearers, estimating a capacitance that is obtained by excluding a capacitance of the radio bearer conducting the constant-speed communication from the lost radio bearers and the data amount as a maximum value of the data amount lost in the radio bearer that is conducting inconstant-speed communication.

10. The cipher processing method as claimed in claim 6, comprising:

estimating the lost data amount based on continuity of serial numbers contained in the protocol data units.

11. A non-transitory computer readable recording medium storing a cipher processing program which controls cipher processing executed on a packet combining data unit that is transmitted from a mobile station of a mobile communication system and received at a base station, the cipher processing program causing a computer to execute:

a function that divides the packet combining data unit into a plurality of protocol data units by each logic channel based on information of the logic channels which specify radio bearers contained in the packet combining data unit;

a function that detects occurrence of loss in the protocol data units created by dividing the packet combining data unit for each of the logic channels by a MAC SDU (service data unit) generating section included in advance, and estimates the radio bearer of the lost protocol data unit and a data amount of the lost protocol data unit;

a function that puts together the divided protocol data units into a service data unit for a higher-level device;

a function that detects occurrence of loss in the protocol data units when making the service data unit, and estimates a lost amount of the protocol data units when making the service data unit based on the estimated data amount; and a function that corrects a frame number of the service data unit based on the data amount that is estimated when making the service data unit.

12. The computer readable recording medium storing the cipher processing program as claimed in claim 11, which estimates that the radio bearer is lost when the radio bearer to be transmitted and received periodically is unreceived after a prescribed time interval has passed.

13. The computer readable recording medium storing the cipher processing program as claimed in claim 11, which estimates the lost radio bearer and the data amount from a proportion of the radio bearer included in the radio bearers of therebefore and thereafter which are received properly.

14. The computer readable recording medium storing the cipher processing program as claimed in claim 11, which, when a radio bearer conducting constant-speed communication is included in the lost radio bearers, estimates a capacitance that is obtained by excluding a capacitance of the radio bearer conducting the constant-speed communication from the lost radio bearers and the data amount as a maximum value of the data amount lost in the radio bearer that is conducting inconstant-speed communication.

15. The computer readable recording medium storing the cipher processing program as claimed in claim 11, which estimates the lost data amount based on continuity of serial numbers contained in the protocol data units.

* * * * *